(12) United States Patent
Dillon et al.

(10) Patent No.: US 7,751,063 B2
(45) Date of Patent: Jul. 6, 2010

(54) MULTIPLE CHANNEL INTERFEROMETRIC SURFACE CONTOUR MEASUREMENT SYSTEM

(75) Inventors: Robert F. Dillon, Chelmsford, MA (US); Neil Judell, Newtonville, MA (US); Yi Qian, Acton, MA (US); Yunqing Zhu, Andover, MA (US); D. Scott Ackerson, Windham, NH (US); Gurpreet Singh, Providence, RI (US)

(73) Assignee: Dimensional Photonics International, Inc., Wilmington, MA (US)

( * ) Notice: Subject to any disclaimer, the term of this patent is extended or adjusted under 35 U.S.C. 154(b) by 250 days.

(21) Appl. No.: 11/910,638

(22) PCT Filed: Apr. 4, 2006

(86) PCT No.: PCT/US2006/012438

§ 371 (c)(1),
(2), (4) Date: Oct. 4, 2007

(87) PCT Pub. No.: WO2006/107928

PCT Pub. Date: Oct. 12, 2006

(65) Prior Publication Data

US 2008/0165341 A1  Jul. 10, 2008

Related U.S. Application Data

(60) Provisional application No. 60/669,039, filed on Apr. 6, 2005.

(51) Int. Cl.
*G01B 9/02* (2006.01)
*G01B 11/02* (2006.01)

(52) U.S. Cl. .................. 356/511; 356/521; 356/497

(58) Field of Classification Search .......... 356/479, 356/497, 511, 521; 250/237 G
See application file for complete search history.

(56) References Cited

U.S. PATENT DOCUMENTS 2,323,493 A  7/1943  Sloane (Continued)

FOREIGN PATENT DOCUMENTS

GB          600234 A       4/1948

OTHER PUBLICATIONS

International Search Report for PCT/US2006/012438 dated Jan. 3, 2008; 7 pages.

(Continued)

*Primary Examiner*—Patrick J Connolly
(74) *Attorney, Agent, or Firm*—Guerin & Rodriguez, LLP; William G. Guerin

(57) ABSTRACT

Described is a multiple channel interferometric surface contour measurement system. The measurement system includes a multiple channel interferometer projector, a digital camera and a processor. The projector includes two or more interferometer channels. Each channel has an optical axis spatially separate from the optical axes of the other channels. Each channel projects a fringe pattern onto the surface of an object to be measured. Image data for the fringe patterns projected on the object surface are acquired by the digital camera. The processor controls the projection of the fringe patterns of different spatial frequencies, adjusts the phase of each fringe pattern and generates surface contour data in response to the camera image data. The multiple channel interferometric surface contour measurement system provides numerous advantages over conventional single channel interferometric systems, including reduced sensitivity to optical noise, improved stability and increased measurement accuracy.

12 Claims, 9 Drawing Sheets

U.S. PATENT DOCUMENTS

| | | | |
|---|---|---|---|
| 2,945,428 A | | 7/1960 | Dearborn |
| 4,329,059 A | | 5/1982 | Pond et al. |
| 4,657,394 A | * | 4/1987 | Halioua .................. 250/237 G |
| 5,636,025 A | * | 6/1997 | Bieman et al. .......... 250/237 G |
| 5,786,896 A | | 7/1998 | Hizuka et al. |
| 5,811,826 A | | 9/1998 | Shirley |
| 5,870,191 A | | 2/1999 | Shirley et al. |
| 5,900,936 A | | 5/1999 | Shirley et al. |
| 6,031,612 A | | 2/2000 | Shirley |
| 6,690,474 B1 | | 2/2004 | Shirley |
| 6,952,270 B2 | | 10/2005 | Shirley |
| 7,184,149 B2 | | 2/2007 | Swanson et al. |
| 7,242,484 B2 | | 7/2007 | Shirley |

OTHER PUBLICATIONS

PCT/US2006/012438 Partial International Search dated Aug. 24, 2006; 2 pages.

* cited by examiner

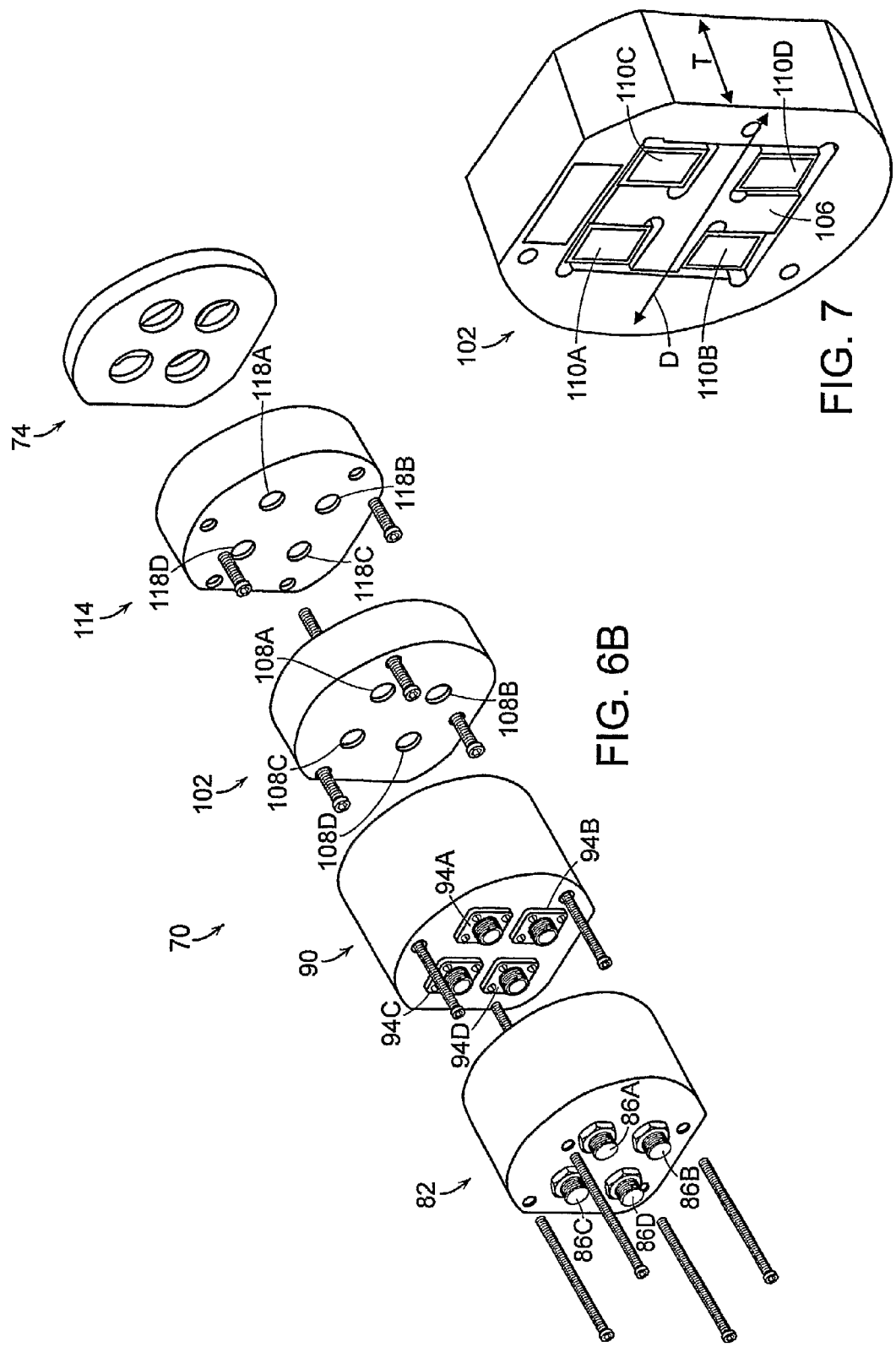

MULTIPLE CHANNEL INTERFEROMETRIC SURFACE CONTOUR MEASUREMENT SYSTEM

RELATED APPLICATIONS

This application claims the benefit of the earlier filing date of U.S. Provisional Patent Application Ser. No. 60/669,039, filed Apr. 6, 2005, titled "Multiple Channel Interferometric Surface Contour Measurement Methods and Apparatus," the entirety of which is incorporated herein by reference.

FIELD OF THE INVENTION

The invention relates generally to the measurement of surface contours and more particularly to a non-contact interferometric system and method for the measurement of surface contours.

BACKGROUND OF THE INVENTION

Surface measurement systems are used in a variety of applications to generate three dimensional surface data of objects. Such systems are employed at various stages in the fabrication and assembly of complex objects across a variety of industries to ensure that the shape and size of the objects meet strict manufacturing tolerances.

Interferometric surface measurement systems have been developed which permit measurements of the surface of an object without physical contact. Coherent optical sources are used to generate a fringe pattern on the surface of the object and a camera acquires images of the fringes on the surface for analysis. In some systems, a diffraction grating is positioned in the path of a laser beam to generate multiple coherent laser beams at various angles to the original beam path. A focusing objective and spatial filter are used to isolate the desired diffracted beam pair. One or more additional diffraction gratings are utilized to project at least one additional set of fringes onto the object surface. This multiplexing of different gratings into the beam path poses many challenges. Moving different gratings into the beam path and shifting each grating to implement phase shifts generally requires multiple mechanical components that add weight, size, complexity and cost to the system. The frequent movement of components affects the stability and therefore the accuracy of the measurement data. Moreover, measuring the displacement of a diffraction grating during the phase shift process with sufficient precision and accuracy can require expensive measurement components such as capacitance gauges.

Other system components can limit the applications for the system. For example, the focusing objective and spatial filter are used for multiple gratings and, therefore, their optical parameters are not optimal for the individual gratings. Moreover, the depth of field of the camera can limit the maximum spatial frequency of the projected fringe pattern, thereby limiting the measurement resolution.

Noise sources also typically limit the measurement data. When laser light is scattered from a surface, a high-contrast, granular speckle pattern is typically observed. Speckle results in part from the roughness of the object surface. In particular, the microscopic roughness of the surface contributes randomly phased contributions of the scattered laser light. These contributions interfere with one another to produce complex intensity variations across the surface of the object as viewed from a distance. Speckle introduces fine-scale intensity fluctuations (i.e., intensity noise) in the observed fringe pattern on the object surface. Shot noise contributions from the individual detectors in the camera can further limit the accuracy of measurement data.

SUMMARY OF THE INVENTION

In one aspect, the invention features a multiple channel interferometer projector for projecting fringes onto a surface of an object. The projector includes a plurality of interferometer channels each having a spatially separate optical axis. Each interferometer channel is adapted to project a fringe pattern onto the surface of the object and includes a diffraction grating disposed on a respective one of the optical axes, an objective in optical communication with the diffraction grating to focus coherent beams propagating from the diffraction grating, and a spatial filter disposed on the optical axis to receive the focused coherent beams and to transmit an ordered pair of coherent beams. The ordered pair of coherent beams interfere to generate the projected fringe pattern. The projector also includes a translation stage coupled to the plurality of diffraction gratings. The translation stage is adapted for spatial translation of the diffraction gratings along a direction perpendicular to the optical axis to phase shift the projected fringes.

In another aspect, the invention features a crossbar for improved orientation stability between two system components in an interferometric measurement system. The crossbar includes an outer cylindrical tube, an inner cylindrical tube and a pair of O-rings. The outer cylindrical tube has a tube axis, an inner surface and two ends. The inner cylindrical tube has a tube axis collinear with the tube axis of the outer tube and also has an outer surface and two ends. The inner cylindrical tube is disposed inside the outer tube and extends outside the two ends of the outer cylindrical tube. Each end of the inner cylindrical tube is adapted for attachment to one of the system components. The O-rings are disposed between the inner surface of the outer cylindrical tube and the outer surface of the inner cylindrical tube. Each O-ring is disposed along a length of the inner cylindrical tube at a predetermined position to reduce changes in the orientation between the two system components as the crossbar is reoriented.

In yet another aspect, the invention features a method for determining position information for a surface of an object. A first fringe pattern of a first spatial frequency is projected along a first axis to irradiate the surface of the object and an image of the irradiated surface is acquired. The first fringe pattern is phase shifted at least two times and an image of the irradiated surface is acquired for each of the phase shifts. A second fringe pattern of a second spatial frequency is projected along a second, spatially separate axis to irradiate the surface of the object and an image of the irradiated surface is acquired. The second fringe pattern is phase shifted at least two times and an image of the irradiated surface is acquired for each of the phase shifts. The positional information for the surface is determined in response to the acquired images of the first and second fringe patterns.

In still another aspect, the invention features a surface contour measurement system. The system includes a multiple channel interferometer projector, a digital camera and a processor. Each interferometer channel has a spatially separate optical axis and is adapted to project a fringe pattern onto a surface of an object. The digital camera acquires images of the fringe patterns projected on the surface of the object. The processor is in electrical communication with the multiple channel interferometer projector and the digital camera. Signals are sent from the processor to the multiple channel interferometer projector to control the projection of fringe patterns of different spatial frequency and to modify the phase of the fringe pattern. The processor generates surface contour data in response to data received from the digital camera for each of the acquired images.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

FIG. 6A and FIG. 6B illustrate exploded perspective views of the projector shown in FIG. 5A and FIG. 5B, respectively.

FIG. 7 shows a perspective view of a diffraction grating module of the projector of FIG. 6A and FIG. 6B according to an embodiment of the invention.

DETAILED DESCRIPTION

In brief overview, the present invention relates to a multiple channel interferometric surface contour measurement system. The measurement system includes a multiple channel interferometer projector, a digital camera and a processor. The projector includes two or more interferometer channels and each interferometer channel has an optical axis spatially separate from the optical axes of the other channels. Each channel projects a fringe pattern onto the surface of an object to be measured. As used herein, a digital camera means an electronic imaging device or system that provides digital image data indicative of intensity as a function of image position. The digital camera acquires image data of the fringe patterns projected on the object surface. The processor communicates with the multiple channel interferometer projector and the digital camera. Signal sent from the processor to the projector control the projection of the fringe patterns of different spatial frequencies and the phase of each fringe pattern. The processor generates surface contour data in response to the camera image data. The multiple channel interferometric surface contour measurement system provides numerous advantages over conventional single channel interferometric systems, including reduced sensitivity to optical noise, improved stability and increased measurement accuracy.

Figure 1:
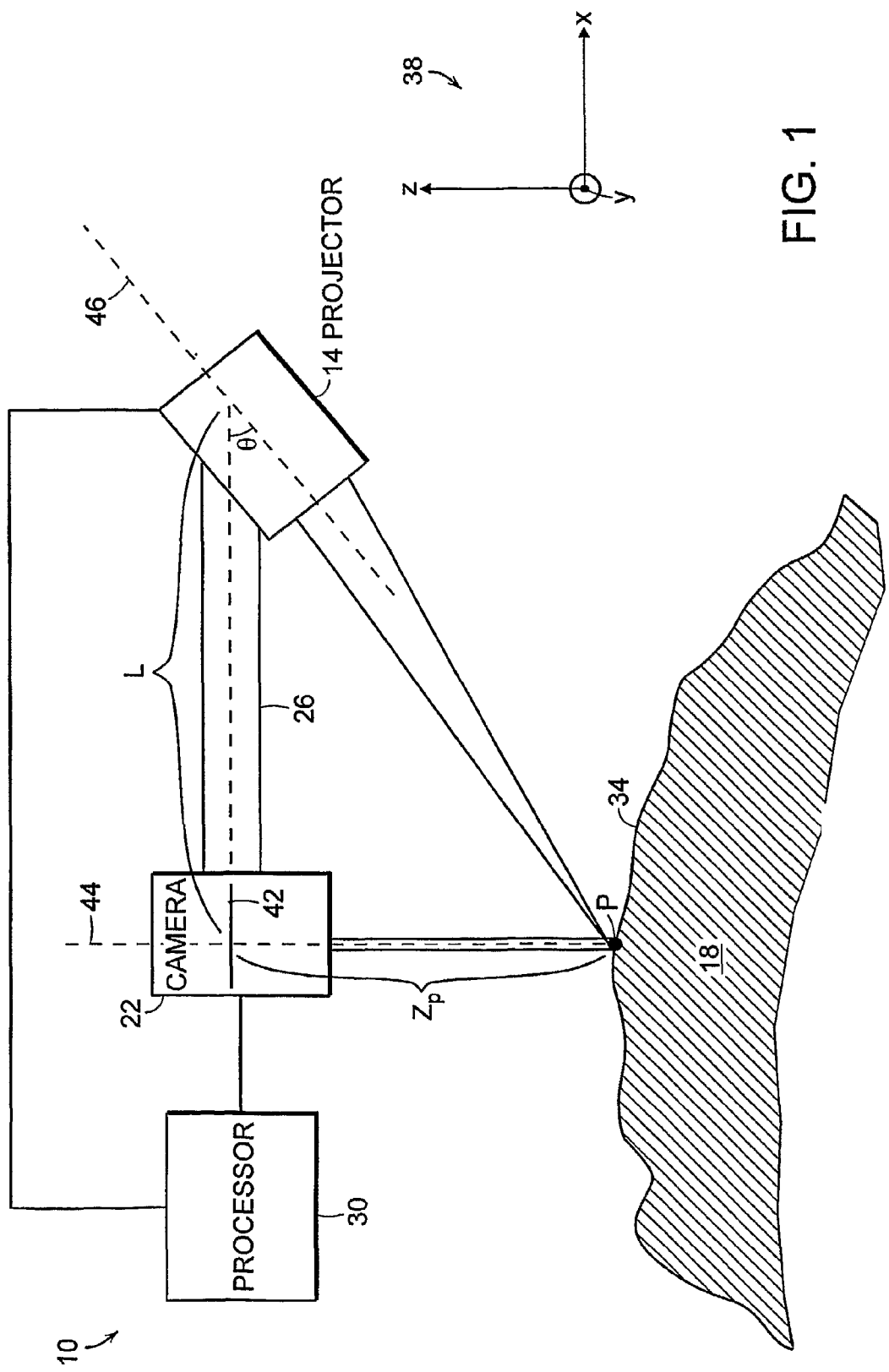
FIG. 1 is a diagram of a surface contour measurement system in which the surface of an object is irradiated with structured light patterns generated according to interferometric principles.

FIG. 1 is an illustration of a surface measurement system 10 in which a projector 14 irradiates a surface of an object of interest 18 with structured light patterns that are generated based on interferometric principles. Images of the irradiated object surface 34 are acquired by a digital camera 22 that is rigidly coupled to the projector 14 via a crossbar 26. The camera 22 is electronically coupled to a processor 30 which is configured to process the acquired images. The processor 30 can be coupled to the projector 14 to control various aspects of the structured light patterns.

The surface measurement system 10 is configured to determine a three-dimensional profile of the surface contour 34. In particular, for a given portion of the surface contour 34 that is within a field of view of the digital camera 22, the processor 30 calculates relative coordinates in three dimensional space for a significant number of points on the object surface 34.

A coordinate system 38 is shown in FIG. 1 to provide a reference for the surface contour measurements. The y-axis of the coordinate system 38 is perpendicular to the plane of the figure. An image plane 42 (e.g., a detector array) of the digital camera 22 lies in an x-y plane in space, and the optical axis 44 of the camera 22 (which is perpendicular to the image plane 42) is parallel to the z-axis of the coordinate system 38. The x-y coordinates of a point P in the camera field of view generally are directly determinable from the known geometry and optical parameters of the camera 22; however, a z-coordinate $z_P$ of the point P is not directly determinable.

Structured light patterns are used to calculate the z-coordinates of points on the object surface 34. Images of structured light patterns irradiating the object surface 34 provide information from which the processor 30 can calculate distances $z_P$ between points P on the object surface and the camera image plane 42. Such calculations are based on triangulation, using a known distance L between the digital camera 22 and the projector 14, and a known angle θ between a central axis 46 of the projector 14 and an axis of the crossbar 26.

In various implementations of the projector 14, light from a coherent light source (e.g., a laser) is separated into two beams. The two beams are directed toward the object surface 34 and caused to interfere with each other so as to generate a pattern of interference fringes comprising periodic bright lines separated by dark lines. As used herein, the process of separating light from a coherent light source into two beams and causing the two beams to interfere to generate a fringe pattern is referred to as "single channel interferometry."

Figure 2:
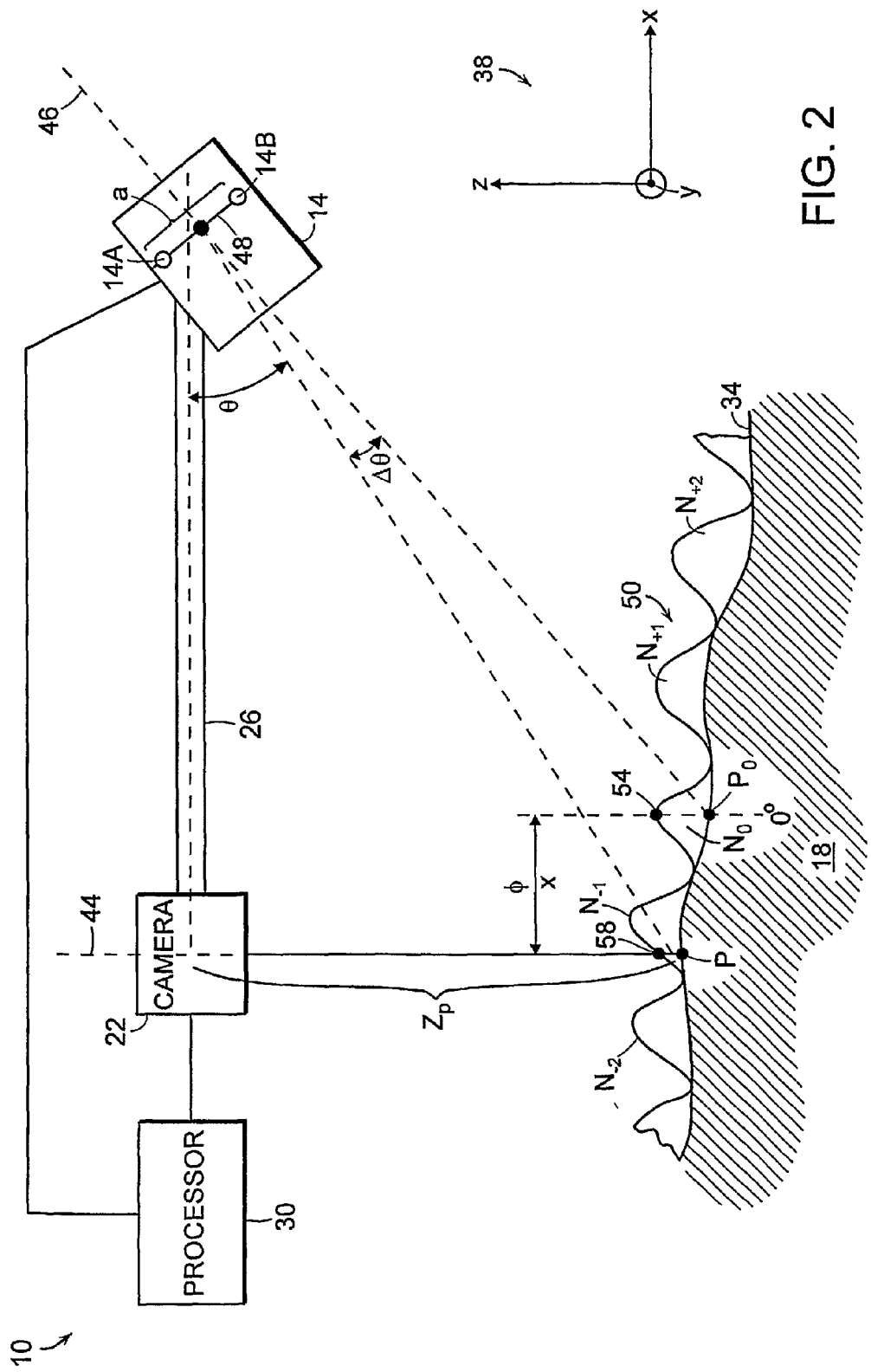
FIG. 2 is another view of the system of FIG. 1 and includes a magnified view of a surface contour of the object.

FIG. 2 is an illustration of the surface measurement system 10 of FIG. 1 and includes a magnified view of the surface contour 34 of the object of interest 18 around a point of interest P for which the distance $z_P$ is to be determined. The projector 14 is configured to irradiate the object surface 34 with a fringe pattern 50 depicted as a periodic wave. The peaks of the periodic wave represent the highest intensities and the troughs of the periodic wave represent the lowest intensities. Thus the areas around the peaks represent bright lines or "fringes" on the object surface 34 that can be observed by the digital camera 22 and the areas around the troughs represent dark lines between neighboring fringes.

The spatial frequency (i.e., periodicity) of the fringe pattern 50 generally is a function of the configuration of the projector 14 and the arrangement of two coherent light sources 14A and 14B or, equivalently, the apparent sources of two spatially distinct beams from a single coherent light source, that interfere with each other. The sources 14A and 14B are separated by a distance a (hereafter the "source separation distance") along an axis 48 perpendicular to the central axis 46 of the projector 14. The spatial frequency of the fringe pattern 50 is determined in part by the source separation distance a. The spatial frequency decreases (i.e., the fringes become "coarser") as the source separation distance a decreases.

In one example, a single channel interferometer projector transmits a laser beam through a diffraction grating having a pitch d (i.e., the spacing between adjacent light perturbing components of the diffraction grating). The laser beam is divided into pairs of coherent beams propagating at various deflection angles from the grating according to their order and the pitch d of the grating. A portion of the laser beam passes through the diffraction grating undeflected as a zero order beam. As the pitch d increases (i.e., as the grating becomes coarser), the deflection angles of the non-zero order beams decrease.

The single channel interferometer utilizes a focusing objective and a spatial filter to isolate the pair of first order beams propagating from the diffraction grating and thereby provide two coherent beams required for interference. Specifically, the focusing objective directs the two first order beams towards two apertures spaced apart at the source separation distance a in the spatial filter. This source separation distance a is determined from the known angles at which the first order beams exit the diffraction grating and the optical properties of the focusing objective. Accordingly, the spatial frequency of the fringe pattern 50 generated by the single channel interferometer is based on the diffraction grating pitch d.

The fringe pattern 50 includes a central fringe having a fringe number $N_0$ and an intensity peak 54, and is associated with a point $P_0$ on the object surface 34 which is intersected by the central axis 46 of the projector 14. As illustrated, the coherent light sources 14A and 14B are disposed symmetrically about the central axis 46. The peak 54 of the central fringe $N_0$ serves as a reference point for the fringe pattern 50, on either side of which are other fringes consecutively labeled $N_{+1}, N_{+2}, \ldots$ moving to the right in the figure and $N_{-1}, N_{-2}, \ldots$ moving to the left in the figure. Accordingly, the peak 54 of the central fringe $N_0$ is associated with a reference phase of 0° for the fringe pattern 50 and the phase between adjacent peaks, or adjacent troughs, is 360° or $2\pi$ radians.

The determination of the distance $z_P$ between the camera 22 and a point of interest P can be determined from the phase $\phi$ between point $P_0$ at the intensity peak 54 and point P at an intensity 58 on the fringe $N_{-1}$. By determining the phase $\phi$, the angle $\Delta\theta$ can be derived and triangulation calculations can be performed based on the angle $\theta-\Delta\theta$ to determine the distance $z_P$. More specifically, if a rational quantity N represents the total integer and fractional number of fringes between the points P and $P_0$, the corresponding phase $\phi$ is given as $\phi=2\pi N$. The quantity N, hereafter referred to as the "fringe number," is given by $$N = \left(\frac{a}{\lambda}\right)\left(\frac{x}{R}\right),$$

where $\alpha$ is the source separation distance described above, $\lambda$ is the optical wavelength of the sources 14A and 14B, x is the physical distance along the x-axis between the points P and $P_0$, and R is the physical distance between the projector 14 and the point $P_0$ as measured along the central axis 46 of the projector 14 from the midpoint of the sources 14A and 14B and the point $P_0$. The equation above is generally valid provided that the source separation distance a and the distance x are relatively small compared to the distance R. Since the parameters a and $\lambda$ are known a priori, observing the phase $\phi$ in terms of the fringe number N from the acquired images of the fringe pattern 50 provides information relating to the parameters x and R which relate to the angle $\Delta\theta$ and allow a determination of the distance $z_P$ by triangulation.

The accuracy with which the distance $z_P$ can be determined is related in part to the spatial frequency of the fringe pattern 50. Profile changes in the surface contour 34 along the z direction correspond to changes in observed intensity of the fringe pattern 50. The resolution of the surface contour measurement increases as the change in intensity for a given change in distance along the z direction increases. Stated differently, as the slope of the individual fringes of the fringe pattern 50 increases, more accurate measurements of the distance $z_P$ can be made. This situation corresponds to "finer" fringes or, equivalently, an increased spatial frequency of the fringe pattern 50 on the object surface 34.

Although the interferometric fringe pattern 50 has an infinite field of focus relative to the projector 14, images of the projected fringe pattern 50 are limited by practical constraints. For example, imaging a fine fringe pattern over a large range in the z direction requires an imaging system having a large depth of focus and high spatial resolution. These requirements are generally difficult to achieve simultaneously and a particular application typically requires a tradeoff between the two parameters. Accordingly, in some projector implementations, the grating pitch d and the source separation distance a for a given single channel interferometer are selected based, at least in part, on a compromise between high measurement resolution and camera depth of field.

Figure 3:
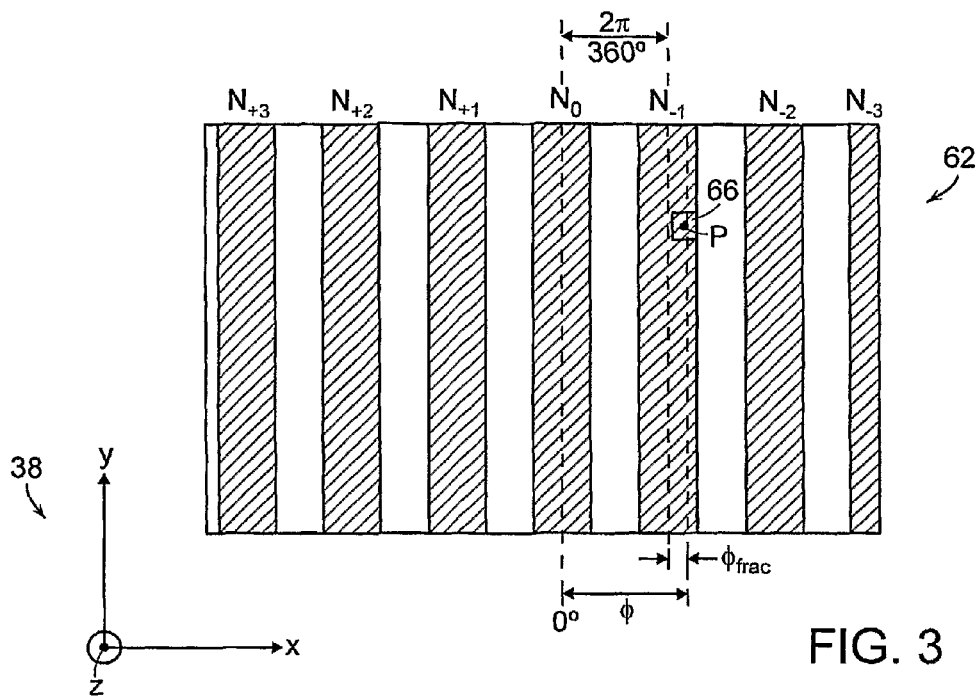
FIG. 3 depicts a portion of an image of the surface of the object of FIG. 2 as irradiated by a first fringe pattern.

FIG. 3 depicts an image 62 of the object surface acquired by the digital camera. Image data is obtained using a two-dimensional matrix of pixels in the camera image plane. Each pixel is associated with an intensity value I based on the light scattered from the object surface and incident on the pixel. One such pixel 66 is shown as containing the point of interest P. The image 62 includes the alternating bright and dark lines of the fringe pattern in which the fringes are indicated with shading and are marked for reference with the designations $N_{+3}$ to $N_{-3}$ moving from left to right in the figure. It should be appreciated that the intensity values of pixels in a row of the image 62 reveal the continuous wave nature of the fringe pattern 50 shown in FIG. 2.

By analyzing the image 62 using the intensity I detected at the pixel 66 to determine the phase $\phi$ at the point P, the distance $z_P$ to the point P can be calculated. Additionally, the x and y coordinates of the point P can be determined from knowledge of the geometry and optical properties of the camera. Performing the analysis and three-dimensional coordinate calculation for each pixel in the image 62 allows a detailed profile, or map, of the object surface to be determined.

The phase $\phi$ is calculated by (i) determining the "fractional phase" $\phi_{frac}$ of the intensity detected for the point P relative to its nearest maximum intensity peak, that is, the center of the fringe $N_{-1}$ and (ii) identifying in the image 62 the location of the zero degree reference phase corresponding to the intensity peak 54 in FIG. 2 so as to determine the portion of the total phase $\phi$ that corresponds to an integer number of fringe peaks. A known phase shift technique can be utilized to determine the fractional phase $\phi_{frac}$. Referring again to FIG. 2, the projector 14 is configured so that the fringe pattern 50 can be phase-shifted by two or more known values relative to its nominal position. For example, the projector 14 can be configured to shift the fringe pattern 50 by shifting the diffraction grating so that the maximum intensity peak 54 of the center fringe $N_0$ is shifted either to the right or left of the point $P_0$ by a known amount $$\left(e.g., \pm 120°, \text{ or } \pm \frac{2}{3}\pi\right).$$

Referring again to FIG. 3, the fractional phase $\phi_{frac}$ can be unambiguously calculated if an image of the fringe pattern 50 is acquired at each of three different known phase shifts (e.g., +120°, 0° and −120°). For each image 62, the intensity I detected by the pixel 66 is determined (e.g., $I_{+120}$, $I_0$ and $I_{-120}$). While phase shifts of ±120° and the reference position of 0° are used in the present example, it should be appreciated that other numbers of phase shifts and other values of phase shift can be utilized in the technique.

The location of the zero degree reference phase in the image 62 is determined so that the portion of the total phase $\phi$ that includes the integer number of fringes can be determined. Although the zero degree reference phase is indicated in the image 62, the corresponding center fringe $N_0$ is otherwise not readily apparent as the fringes $N_{+3}$ to $N_{-3}$ appear identical. This fringe similarity results in a "$2\pi$ ambiguity because there is no analysis of a single image that yields the integer number of fringe peaks from the 0° phase fringe and the point P. Resolving the $2\pi$ ambiguity to determine the integer number of peaks contributing to the phase $\phi$ is referred to in the art as "fringe unwrapping."

Figure 4:
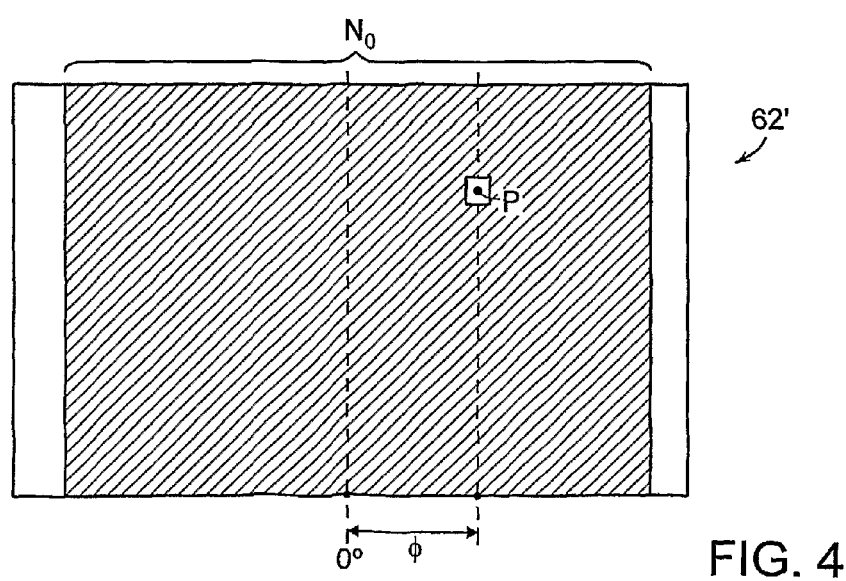
FIG. 4 shows a view of a portion of an image of the surface of the object of FIG. 2 as irradiated by a second fringe pattern.

Fringe unwrapping can be described with reference to FIG. 4 in which an image 62' of a different fringe pattern projected onto the object surface is acquired. In this instance the projector irradiates the object surface with a coarse (i.e., lower spatial frequency) fringe pattern. The coarse fringe pattern includes only one fringe within the camera field of view, namely the central fringe $N_0$, wherein the fringe pattern is calibrated to have the same zero degree reference phase as the fringe pattern 50 shown in FIG. 2 and FIG. 3. Using only the single central fringe $N_0$, the phase $\phi$ corresponding to the point of interest P can be determined directly using the phase shift technique discussed above. Ambiguity is avoided because the phase $\phi$ variation across the image 62' is less than $2\pi$. It should be appreciated, however, that the smaller slope of the coarse fringe pattern results in a lower resolution and accuracy for the determination of the phase $\phi$ and the distance $z_P$. Thus the accuracy of the calculated distance $z_P$ can be unacceptable for many applications.

In view of the above limitations, an iterative technique can be employed in which the projector is configured to alternately project coarse and fine fringe patterns onto the object surface wherein the 0° reference phases for the coarse and fine fringe patterns are precisely calibrated to have a known relationship. For each projection of a coarse or fine fringe pattern, three or more images are acquired to implement the phase shift technique described above. In one example utilizing only three phase positions, a coarse fringe pattern is projected, imaged, phase shifted once, imaged again, phase shifted a second time, and imaged again to acquire a total of three images. The same three image procedure is implemented for the fine fringe pattern. Based on the acquisition of the three fine fringe images, a higher resolution determination of the fractional phase $\phi_{frac}$ can be determined. Using a known phase relationship between the coarse and fine fringe patterns, a higher resolution determination of the phase $\phi$ (a "fine $\phi$") can be determined using the coarse $\phi$ and the fractional phase $\phi_{frac}$. In this manner, the coarse phase $\phi$ is used to "unwrap" the fringe number for the fractional phase $\phi_{frac}$ to permit determination of the fine phase $\phi$. Finally, a higher resolution determination of the distance $z_P$ is calculated based on the fine phase $\phi$. The foregoing unwrapping procedure is performed for each pixel to determine respective x, y and z coordinates and to generate a comprehensive higher resolution profile, or map, of the surface contour.

While in some instances the iterative unwrapping technique permits the phase $\phi$ to be determined with sufficient resolution, generally it is difficult to generate coarse fringe patterns in which only one central fringe is projected in the field of view. To generate coarse fringe patterns using an interferometer employing a diffraction grating, a large grating pitch d is required. However, as the grating pitch d is increased, the grating generally becomes less efficient, that is, less optical power is diffracted into the non-zero order modes. Consequently, the available laser power can limit the grating pitch d if sufficient laser power is not otherwise present in the first order modes to generate fringe pattern intensities sufficient for imaging.

One conventional technique for simulating a coarse fringe pattern employs two less coarse (i.e., higher spatial frequency) diffraction gratings having slightly different grating pitches d. Consequently, the fringe patterns generated by such gratings have similar but not identical spatial frequencies. Images of the two fringe patterns are analyzed to determine a beat frequency between the similar spatial frequencies to synthesize a significantly coarser fringe pattern for the determination of the phase $\phi$ without any $2\pi$ ambiguity. Although the synthesized coarse fringe pattern requires an additional diffraction grating, the optical power efficiency limitation typically associated with a single coarse diffraction grating is eliminated.

In some implementations of the above iterative measurement technique, the diffraction gratings are sequentially moved into the path of a laser beam to generate the different fringe patterns. In particular, each diffraction grating generates a set of diffracted beams which are focused by an objective and spatially filtered to isolate the pair of first order beams to generate the fringe pattern. The distance between the apertures of the spatial filter and the size of the apertures are selected to accommodate the different source separation distances (e.g., $a_{fine}$ and $a_{coarse}$) between the focused first order beams. Thus, a single channel interferometer projector is implemented in which different diffraction gratings are multiplexed into the beam path to generate different fringe patterns.

One aspect of the present invention is directed to a multiple channel interferometer projector that can be employed as a replacement for the projector 14 in the measurement system 10 depicted in FIG. 1 and FIG. 2. The multiple channel interferometer projector includes two or more interferometer channels that are spatially separated from each other. The multiple channel interferometer projector achieves a significant improvement in system performance and measurement accuracy in comparison to the single channel interferometer projectors discussed above.

Advantageously, as an optical component set is provided for each of the interferometer channels, the need to alternately move different diffraction gratings into the coherent beam path is eliminated. Instead, the only grating movement is a significantly smaller grating displacement for each diffraction grating relative to a reference phase position to implement the phase shifting technique described above. The major reduction in the grating displacement yields a significant decrease in the mechanical complexity, weight and size of the projector, an improvement in overall projector stability, and a significant increase in measurement speed and accuracy. Another advantage is the higher system reliability provided by the projector. If one of the interferometer channels fails to operate properly, surface contour measurements may still be possible using the other channels. Moreover, in some instances, if data obtained using one of the channels is inconsistent with data obtained from other channels, the suspect data can be ignored and the user can be alerted to the discrepancy.

The multiple, spatially diverse interferometer channels provide additional advantages. Averaging the measurements obtained from multiple channels results in a decrease in the effect of optical noise on the calculated surface contour data. For example, measurement error introduced by photon shot noise and speckle decreases by an amount proportional to the square root of the number of channels averaged. In particular, speckle error is significantly reduced by analyzing multiple images having uncorrelated speckle due to the spatial separation and associated angle diversity between the two fine interferometer channels. As a result, the z coordinates of an imaged surface contour can be determined with high accuracy over a large field of view. In various embodiments described below, the z coordinates can be determined with an accuracy of better than 10 micrometers over a 0.5 meter field of view.

A further advantage of multiple channels is the reduction of the effects of projector optical aberrations on measurement accuracy. Each interferometer channel exhibits inaccuracies due to specific optical aberrations caused by the optical components in the channel. However, multiple channel measurements are averaged together to generate a final measurement result and the effect of individual channel aberration errors are decreased due to the uncorrelated nature of the aberrations between channels.

Based at least in part on the noise reduction advantages provided by a multiple channel interferometer projector according to various embodiments of the present invention, the spatial frequency of the fine fringe patterns can be reduced in many applications while maintaining sufficient measurement resolution. As previously described, utilizing fine fringe patterns of high spatial frequency for increased measurement resolution can limit the practical imaging depth of field of the camera, therefore there can be a compromise required between measurement resolution and imaging depth of field. The substantial noise reduction in the measurement process achieved with the multiple channel interferometer of the present invention can, in many instances, provide a significant improvement in signal-to-noise ratio to allow a reduction in the spatial frequency of the fine fringe patterns without sacrificing a desired measurement resolution or a greater imaging distance between the camera and the object surface.

Figure 5B:
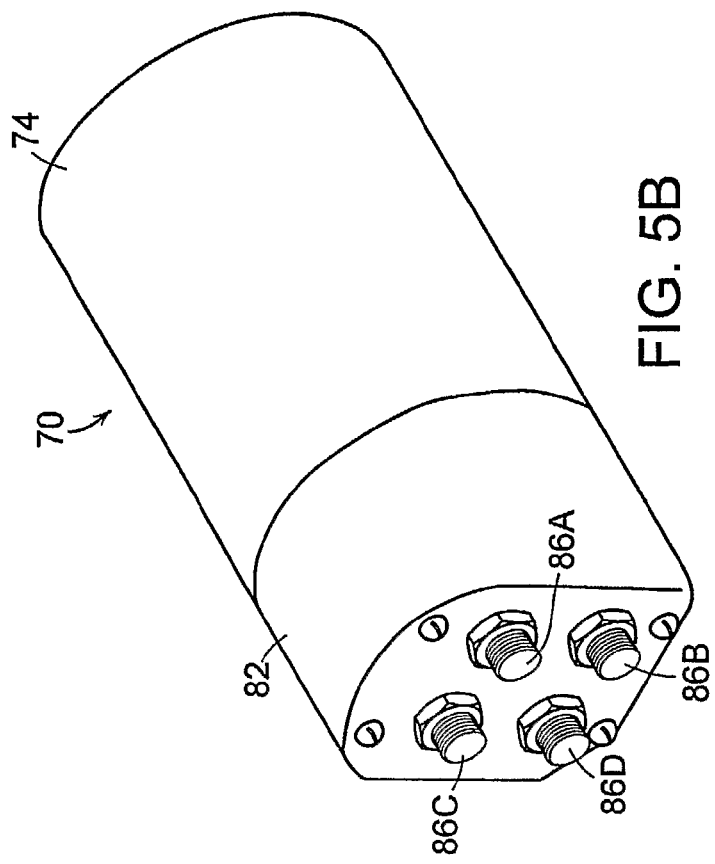
FIG. 5A and FIG. 5B illustrate front and rear perspective views, respectively, of a multiple channel interferometer projector according to an embodiment of the invention.
Figure 5A:
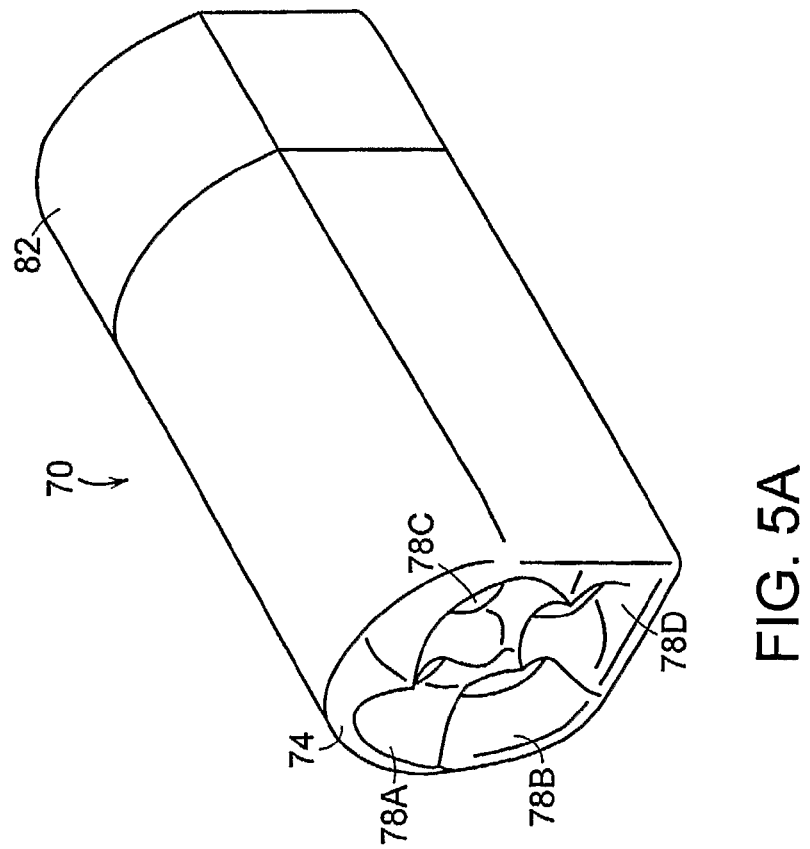

FIG. 5A and FIG. 5B illustrate front and rear perspective views, respectively, of a multiple channel interferometer projector 70 constructed in accordance with the present invention. In the illustrated embodiment, the projector 70 has an approximately cylindrical form, a length of approximately 140 millimeters, a diameter of approximately 65 millimeters and a weight of less than 1 kilogram. The projector 70 includes four interferometer channels although in other embodiments different numbers of channels are employed. The projector 70 includes a front end cap 74 having four passageways 78A, 78B, 78C and 78D (generally 78) through which pass the optical radiation from the interferometer channels. A rear end cap 82 includes four optical couplers 86A, 86B, 86C and 86D (generally 86) to provide for coupling an optical light source to each of the four interferometer channels.

The interferometer channels can be sourced by a single laser beam that is multiplexed in space and optionally in time. In one exemplary implementation, a single laser source is separated into four optical signals and each optical signal is coupled to a respective one of the four optical couplers 86, for example, by an optical fiber. Alternatively, one or more interferometer channels are sourced by a dedicated laser source such that at least two laser sources are utilized with the projector 70. According to one implementation, a laser source used for the multiple channel interferometer projector 70 of the present disclosure has a wavelength of 658 nanometers and generates approximately 50 to 100 milliwatts of optical power.

In another embodiment, different interferometer channels of the projector 70 utilize different wavelengths of radiation. The fringe patterns generated by two or more spatially-separated different-wavelength interferometer channels are projected simultaneously onto an object surface, imaged simultaneously by a camera, and processed separately according to the wavelengths. For example, image data generated at the camera can be separated according to color and processed independently. Alternatively, fringe patterns projected by two or more spatially-separated different-wavelength channels can be temporally multiplexed and synchronized with data acquisition by the camera for separate processing.

Figure 6A:
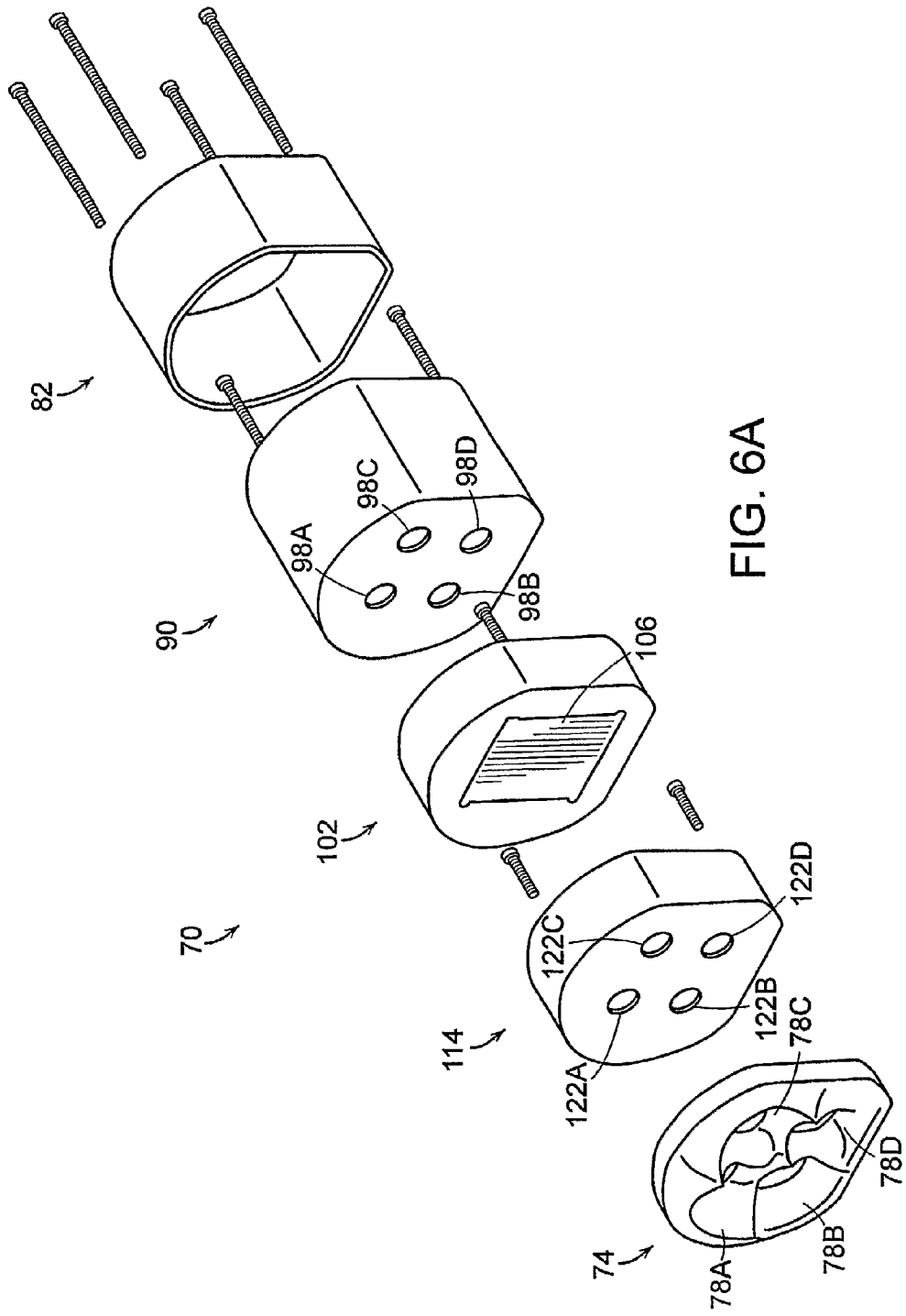

FIG. 6A and FIG. 6B illustrate front and rear exploded perspective views, respectively, of the projector 70 shown in FIG. 5A and FIG. 5B. According to the illustrated embodiment, a number of separate modules are mechanically coupled to form the projector 70. Each module includes one or more components for each interferometer channel so that a total of four component sets are employed per module. Each component set of a given module comprises a particular functional portion of a respective one of the four interferometer channels.

More specifically, the projector 70 includes a collimator lens module 90 including four fiber couplers 94A, 94B, 94C and 94D and four collimator lenses 98A, 98B, 98C and 98D (generally 98). Each coupler-lens pair receives laser light in a respective interferometer channel. The laser light is supplied to the projector 70 through optical fibers secured by the couplers 86 of the rear end cap 82. The collimator lens module 90 is configured such that an end face of the optical fiber for each channel is aligned to a corresponding collimator lens 98.

The projector 70 also includes a diffraction grating module 102 that includes four diffraction gratings. In one embodiment, the diffraction gratings are integral to a common substrate disposed over four clear apertures 108A, 108B, 108C and 108D so that each grating is irradiated with collimated laser light from a corresponding lens 98 in the collimator lens module 90. In another embodiment, the four diffraction gratings, 110B, 110C and 110D (generally 110) are individually fabricated and then attached to a common platform 106 as shown in FIG. 7. In one exemplary implementation, the module 102 has an approximate diameter D of 67 millimeters and an approximate thickness T of 19 millimeters. The common substrate 106 (or platform) can be laterally displaced along a direction perpendicular to the central axis of the projector 70 such that the fringe patterns projected on an object surface are translated along a direction parallel to the x-axis of the coordinate system 30 (see FIG. 3). The diffraction grating module 102 can include a single axis translation stage coupled to the common substrate 106 (or platform), one or more actuators (e.g., piezoelectric transducers) and one or more high accuracy position sensors (e.g., capacitive probes) to provide closed-loop precision shifting (i.e., "micro-positioning") for implementing the phase shift technique described above.

Preferably only the first diffraction orders generated by the diffraction gratings 110 are used to generate the two sources of radiation used for each interferometer channel. In a preferred embodiment, the diffraction gratings 110 are transmissive optical components configured for high efficiency of the first diffraction orders. For example, to achieve a near-optimum first order efficiency, the diffraction gratings are configured as 50% duty cycle binary phase gratings having a phase depth of one-half the wavelength $\lambda$ of the laser light or, equivalently, the physical depth $\delta$ of the grating thickness variation is $\delta/2(n-1)$ where n is the index of refraction of the grating substrate 106. Diffraction gratings fabricated with these properties can transmit approximately 81% of the incident laser light in the first order beams. In an exemplary embodiment, the diffraction gratings 110 are fabricated on a fused silica substrate having an index of refraction n of 1.457 at a wavelength $\lambda$ of 658 nanometers. Based on these parameters, the physical depth J of the gratings is 0.72 micrometers and the first order beams include approximately 79% of the optical power in the incident laser beam. In another embodiment, the diffraction gratings 110 are fabricated on a fused silica substrate having a thickness of approximately 2.5 millimeters. Four grating patterns are written on a photomask covering the substrate using electron beam lithography and ion etching is used to form the patterns in the fused silica. Each diffraction grating 110 is rectangular with dimensions of approximately 8 millimeters by 10 millimeters. Once the diffraction gratings are formed, both sides of the grating substrate are anti-reflection (AR) coated. For example, a multi-layer dielectric AR coating can be applied to limit the reflectivity per surface to be less than 0.5% at the operating wavelength $\lambda$.

Figure 8A:
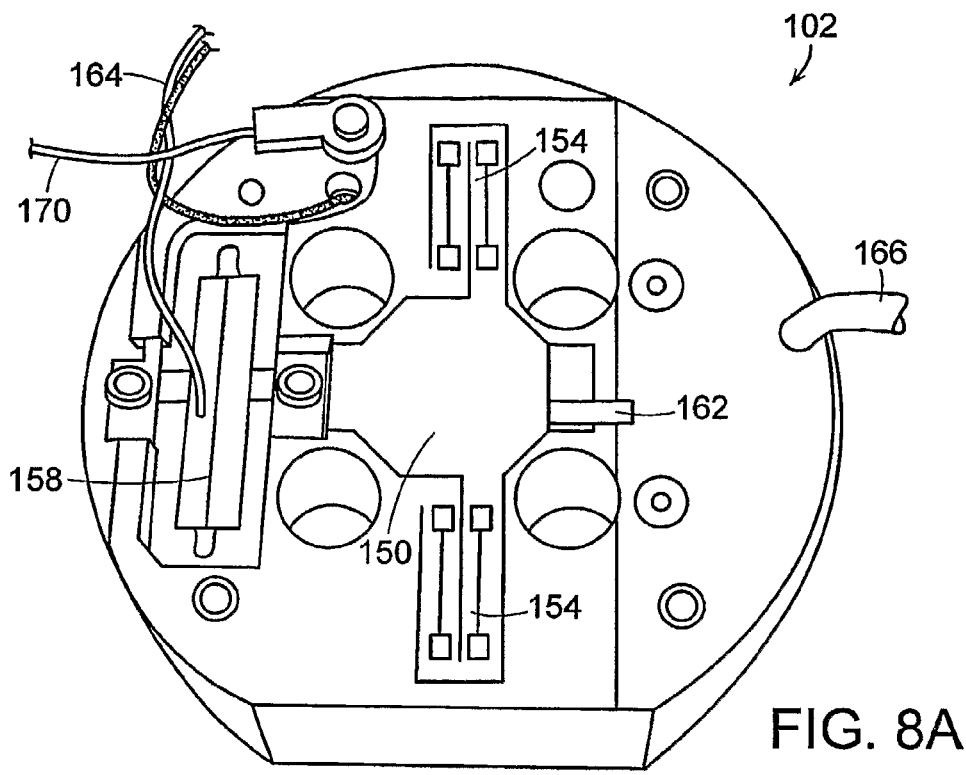
FIG. 8A and FIG. 8B illustrate rear and front perspective views, respectively, of the diffraction grating module of FIG. 7 with the grating substrate removed.
Figure 8B:
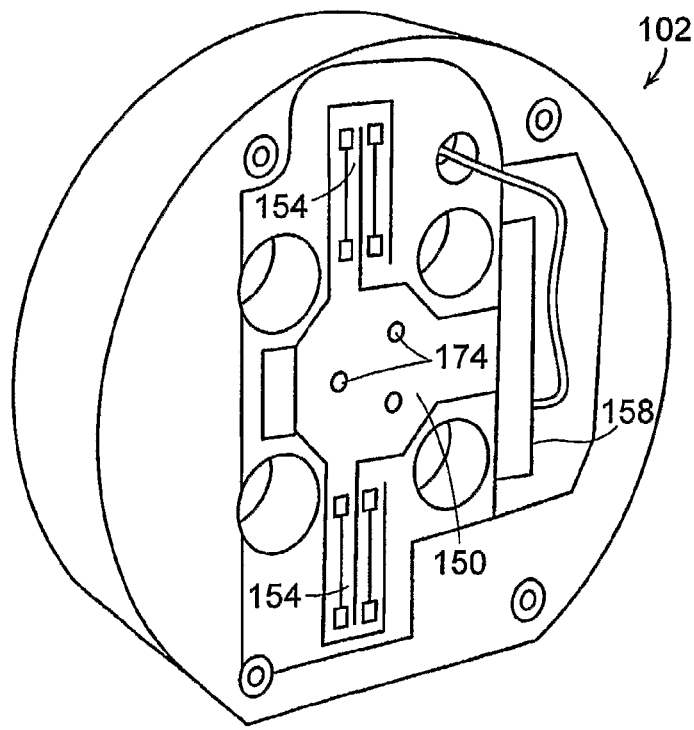

FIG. 8A and FIG. 8B illustrate detailed rear and front views, respectively, of the diffraction grating module 102. The grating substrate is not shown so that other components of the module 102 can be viewed. A centrally located translation stage 150 provides movement along a single axis parallel to the bottom flat edge of the module 102. The translation stage 150 includes small threaded bores 174 for attachment of the grating substrate 106 using screws. Alternatively, any of a variety of adhesives can be used to attach the grating substrate 106.

The movement of the stage 150 is facilitated by two symmetrically disposed flexure assemblies 154. An electrically controlled actuator 158 (e.g., a piezoelectric transducer) coupled to the translation stage 150 provides precise linear motion by exerting a force on the stage 150 that deflects the flexure assemblies 154. A precision position sensor 162 such as a capacitive probe is coupled to the stage 150 to detect motion.

In one embodiment, the actuator 158 and the position sensor 162 are part of a closed-loop servo control system for positioning the stage 150. For example, the actuator 158 is controlled by electrical signals transmitted over wires 164 and a feedback signal from the position sensor 162 is transmitted over cable 166. A wire 170 is coupled to a reference voltage (i.e., ground, not shown) and a ground plane of the module 102. In one exemplary implementation, the translation stage 150 and control components are configured to facilitate stage movement over a range of approximately 250 micrometers, with a positional resolution of approximately 30 nanometers. A translation stage assembly and associated control components similar to those described above are available from Dynamic Structures and Materials, LLC, of Franklin, Tenn.

In one embodiment, at least one of the actuator 158 and the position sensor 162 are coupled to a processor (e.g., processor 30 in FIG. 1) through the wires 164 and cable 166), and the processor can be configured to implement a servo control loop for precision movement of the translation stage 150. Other control components can be employed in addition to or in place of the processor to facilitate control loop signal conditioning and amplification.

Referring again to FIG. 6A and FIG. 6B, the projector 70 also includes an objective and spatial filter module 114 to optically process the laser light from the diffraction gratings. The module 114 includes four projection lenses 118A, 118B, 118C and 118D (generally 118). Each lens 118 focuses the first order diffracted beams from a respective diffraction grating. Preferably, the focal length of each lens 118 if manufactured to a tolerance to ensure that the focused beams are aligned with the apertures of a respective spatial filter. The focal length can vary according to implementation. In one exemplary implementation, each lens has an effective focal length of 8 millimeters. The numerical aperture of each projection lens determines how quickly the fringe pattern expands as it exist the projector 70 and, therefore, can be selected to accommodate the required standoff distance between the projector 70 and the object surface. In one implementation the numerical aperture is 0.45 and the angle of the first order beams with respect to the channel axis is approximately ±0.2°. Each projection lens 118 is adapted to operate over a finite wavelength range about the wavelength $\lambda$ for a given channel (e.g., 20 nanometers) to accommodate small changes in wavelength, for example, due to changes in operating temperature. Preferably, each projection lens 118 has an AR coating such as a multiple-layer dielectric coating for improved optical transmission.

Each diffraction grating is positioned relative to a respective lens 118 such that the plane of the diffraction grating is imaged onto the object surface. Consequently, any error in the pointing angle of the laser illumination of a grating does not result in a significant change in the position of the $N_0$ fringe location at the object plane.

The objective and spatial filter module 114 also includes four spatial filters 122A, 122B, 122C and 122D (generally 122). Each spatial filter 122 includes two spaced apart pinhole apertures to pass the focused beams of the first diffracted orders. In one exemplary implementation, each spatial filter 122 is constructed of a thin fused silica substrate coated with an opaque metal layer such as a chromium layer. The metal layer is etched using a photolithographic technique to create two transparent pinholes. The fused silica substrate has an AR coating on both sides for improved transmission through the pinhole apertures.

The spatial filters 122 provide a significant advantage over spatial filters employed in conventional interferometer projectors. More specifically, conventional projectors utilize a spatial filter having multiple pairs of pinhole apertures with each pair matched to a particular diffraction grating. Thus only one pair of pinhole apertures provides the desired beams. Other pairs of pinhole apertures can pass coherent light which can create other less intense fringe patterns having different spatial frequencies on the object surface. As a consequence, the surface contour data is less accurate and can exhibit harmonic variations.

The optical reflectivity of the surface of an object can vary with position. As a result, an image of the object surface can include significant variations in intensity independent of the fringe intensity variations. Such intensity variations can prevent observation of the fringe pattern in portions of the image or can result in image saturation in other portions of the image.

Figure 9:
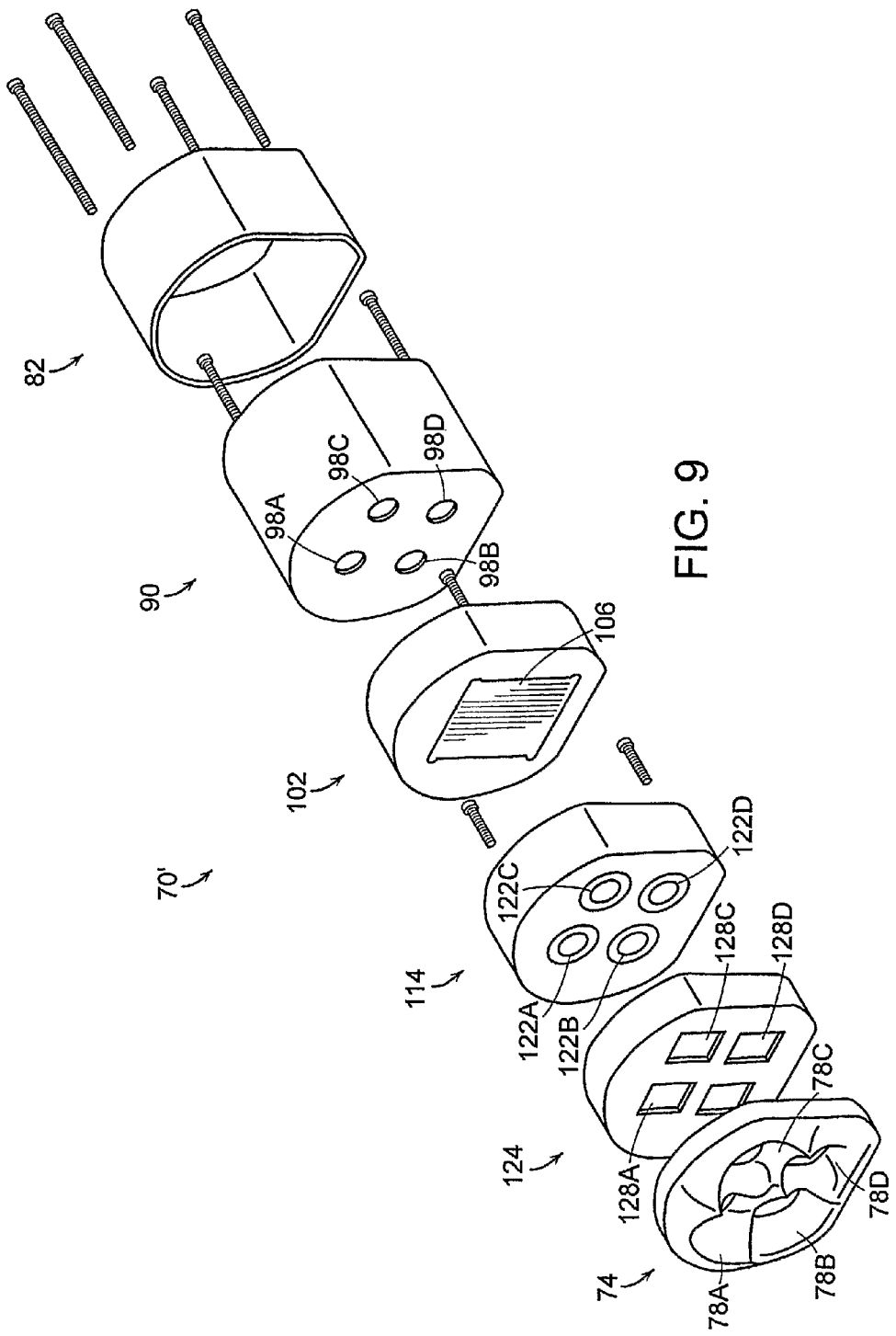
FIG. 9 illustrates an exploded perspective view of a multiple channel interferometer projector having an intensity shaping module according to another embodiment of the invention.

In one embodiment of the present invention, optical processing methods and devices compensate for intensity variations in the fringe patterns due to varying surface reflectivity. In one exemplary implementation, the compensation is based on modifying the intensity profile of a fringe pattern (i.e., "intensity shaping") at the projector. In one embodiment, the projector 70' includes an intensity shaping module 124 disposed between the front end cap 74 and the objective and spatial filter module 114 as shown in FIG. 9. The intensity shaping module 124 includes four optical processors 128A, 128B, 128C and 128D (generally 128). In a preferred embodiment, the intensity shaping module 124 is positioned in the collimated beams between the collimator lens module 90 and the diffraction grating module 102. In another embodiment, the intensity shaping module 124 includes a single optical processor that performs optical processing for two or more channels.

The optical processors 128 are configured to selectively attenuate portions of one or more fringe patterns projected from the focusing objective and spatial filter module 114. In one exemplary implementation, one or more of the optical processors 128 are provided as high resolution liquid crystal displays (LCDs) wherein the optical transmissivity of individual pixels of each LCD are individually controlled, for example, by a processor such as that depicted in FIG. 1. In this manner, intensity shaping of the projected fringe pattern can be utilized to compensate for a variety of complex surface reflectivities.

Figure 10:
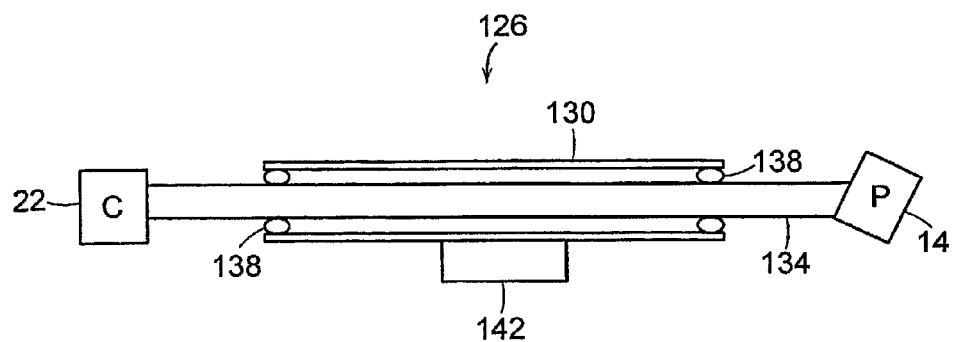
FIG. 10 is a cross-sectional diagram of a crossbar for rigidly coupling a camera to a projector according to an embodiment of the invention.
Figure 11:
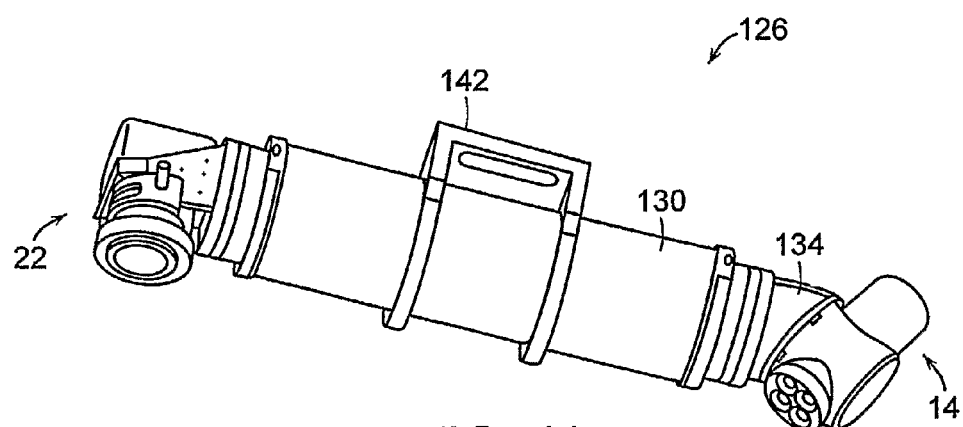
FIG. 11 is a perspective view of a crossbar for rigidly coupling a camera to a projector according to an embodiment of the invention.

Although the embodiments described above relate primarily to a projector for a multiple channel interferometric surface measurement system, the invention also contemplates system embodiments having a crossbar that provides improved structural, thermal and load stability. FIG. 10 is a cross-sectional block diagram depicting a crossbar 126 for rigidly coupling a camera 22 to a projector 14 according to an embodiment of the invention and FIG. 11 shows a perspective view of an assembled crossbar 126. The crossbar 126 is configured as a sleeve-like structure that includes an outer tube 130 coupled to an inner tube 134 through two O-rings 138. The O-rings 138 are located along the length of the inner tube 134 at two positions determined to significantly reduce changes in the orientation of the camera 22 relative to the projector 14 and to significantly reduce changes in the translation of the camera 22 and the projector 14 relative to a mounting plate 142 secured to the outer tube 130. The changes are due primarily to gravity and typically occur when the crossbar 126 is reoriented. The body weight of the inner tube 134 compensates for angular changes caused by the two loads (i.e., the camera 22 and the projector 14). The O-rings 138 reduce local stresses and distribute the weight of the inner tube 134 over a significant surface area of the inner surface of the outer tube 130. In one embodiment, the inner tube 134 is kinematically constrained for axial and radial movement. Preferably, the outer tube 130, inner tube 134 and mounting plate 142 are fabricated from identical materials or materials for which the coefficients of thermal expansion are closely matched so that thermal changes in the measurement environment do not significantly affect measurement accuracy. In one embodiment, the outer tube 130, inner tube 134 and mounting plate 142 are fabricated from aluminum.

While the invention has been shown and described with reference to specific embodiments, it should be understood by those skilled in the art that various changes in form and detail may be made therein without departing from the spirit and scope of the invention.

What is claimed is:

1. A multiple channel interferometer projector for projecting fringes onto a surface of an object, comprising:
   a plurality of interferometer channels each having a spatially separate optical axis and adapted to project a fringe pattern onto the surface of the object, each interferometer channel comprising:
      a diffraction grating disposed on a respective one of the spatially separate optical axes;
      an objective in optical communication with the diffraction grating to focus coherent beams propagating from the diffraction grating; and
      a spatial filter disposed on the respective one of the spatially separate optical axes to receive the focused coherent beams and to transmit an ordered pair of coherent beams, wherein the ordered pair of coherent beams interfere to generate the projected fringe pattern; and
   a translation stage coupled to the plurality of diffraction gratings, the translation stage adapted for spatial translation of the diffraction gratings along a direction perpendicular to the spatially separate optical axes to phase shift the projected fringes.

2. The multiple channel interferometer projector of claim 1 wherein the diffraction gratings are on a common substrate.

3. The multiple channel interferometer projector of claim 1 further comprising a plurality of coherent light sources each in optical communication with a respective one of the diffraction gratings.

4. The multiple channel interferometer projector of claim 3 wherein each of the coherent light sources has a unique wavelength.

5. The multiple channel interferometer projector of claim 1 further comprising a coherent light source in optical communication with the diffraction grating of at least two of the interferometer channels.

6. The multiple channel interferometer projector of claim 1 further comprising a position sensor disposed proximate to the translation stage to detect a displacement thereof.

7. The multiple channel interferometer projector of claim 1 further comprising an optical processor disposed on the spatially separate optical axis of at least one of the interferometer channels to receive the projected fringe pattern and selectively attenuate portions thereof.

8. The multiple channel interferometer projector of claim 7 wherein the optical processor is in optical communication with the diffraction gratings of the at least one interferometer channels and wherein, for each of the at least one interferometer channels, the optical processor receives a collimated beam and transmits a selectively attenuated beam.

9. The multiple channel interferometer projector of claim 7 wherein the optical processor comprises a liquid crystal display device.

10. A method for determining position information for a surface of an object, the method comprising:
    projecting a first fringe pattern of a first spatial frequency along a first axis to irradiate the surface of the object;
    acquiring an image of the irradiated surface of the object;
    phase shifting the first fringe pattern at least two times and acquiring an image of the irradiated surface for each of the phase shifts;

projecting a second fringe pattern of a second spatial frequency along a second axis to irradiate the surface of the object, wherein the first and second axes are spatially separate;

acquiring an image of the irradiated surface of the object;

phase shifting the second fringe pattern at least two times and acquiring an image of the irradiated surface for each of the phase shifts; and determining the positional information for the surface in response to the acquired images of the first and second fringe patterns.

11. A surface contour measurement system comprising:

a multiple channel interferometer projector having a plurality of interferometer channels, each interferometer channel having a spatially separate optical axis and adapted to project a fringe pattern onto a surface of an object, each interferometer channel further comprising:

a diffraction grating disposed on a respective one of the spatially separate optical axes;

an objective in optical communication with the diffraction grating to focus coherent beams propagating from the diffraction grating; and a spatial filter in optical communication with the objective to receive the focused coherent beams and to transmit an ordered pair of coherent beams, wherein the ordered pair of coherent beams interfere to generate the projected fringe pattern;

a digital camera to acquire images of the fringe patterns projected on the surface of the object; and a processor in electrical communication with the multiple channel interferometer projector and the digital camera, the processor sending signals to the multiple channel interferometer projector to control the projection of fringe patterns of different spatial frequency and to modify the phase of the fringe patterns, the processor generating surface contour data in response to data received from the digital camera for each of the acquired images.

12. The surface contour measurement system of claim 11 further comprising a translation stage coupled to the plurality of diffraction gratings, the translation stage adapted for spatial translation of the diffraction gratings along a direction perpendicular to the spatially separate optical axes to phase shift the projected fringe patterns.

* * * * *